United States Patent [19]

Bowling

[11] Patent Number: 5,600,904
[45] Date of Patent: Feb. 11, 1997

[54] IMPACT DRIVEN TREE TRANSPLANTING APPARATUS

[76] Inventor: John M. Bowling, 9376 Lincoln Way East, Orrville, Ohio 44667

[21] Appl. No.: 429,539

[22] Filed: Apr. 26, 1995

[51] Int. Cl.$^6$ .................................................. A01B 13/00
[52] U.S. Cl. ................................................. 37/302; 111/101
[58] Field of Search ............................. 37/302, 303, 304; 111/101, 102; 414/23, 687; 144/2 Z, 3 D, 2 N, 34 E, 34 K

[56] References Cited

U.S. PATENT DOCUMENTS

| | | |
|---|---|---|
| D. 343,102 | 1/1994 | Tanner . |
| 3,017,707 | 1/1962 | Sigler et al. . |
| 3,191,982 | 6/1965 | Goalard . |
| 3,427,734 | 2/1969 | Eberhart . |
| 3,558,177 | 1/1971 | Snead ............................ 37/302 X |
| 3,618,234 | 11/1971 | Bates . |
| 4,226,033 | 10/1980 | DeHaan . |
| 4,286,398 | 9/1981 | Lemond et al. . |
| 4,301,605 | 11/1981 | Newman . |
| 4,351,253 | 9/1982 | Dahlquist ........................ 37/302 X |
| 4,602,444 | 7/1986 | Endo ................................ 111/101 |
| 4,625,662 | 12/1986 | Heinzen ......................... 111/101 |
| 4,658,518 | 4/1987 | Korenek . |
| 4,676,013 | 6/1987 | Endo ................................ 111/101 |
| 5,029,651 | 7/1991 | Ubbink . |
| 5,042,591 | 8/1991 | Hull . |
| 5,081,941 | 1/1992 | Weeks . |
| 5,408,768 | 4/1995 | Karani ............................ 172/664 X |

*Primary Examiner*—Terry Lee Melius
*Assistant Examiner*—Robert Pezzuto
*Attorney, Agent, or Firm*— Oldham & Oldham Co LPA

[57] ABSTRACT

The present invention relates to an impact driven tree transplanting device or tree spade wherein each of the excavation blades is connected to an impact device for generating and/or transferring a series of repetitive impacts or blows to the excavation blades so that the blades more easily enter the earth surrounding the base of a tree or another location. Specifically, the impact devices cause the blades to move more easily downward into the earth by cutting through roots and by breaking and/or displacing rocks and other obstructions. The present invention also includes the ability to lift a tree from the ground and transport the same to another location. Also, the present invention may be used in a non-impact driven mode where relatively loose soil or otherwise easily excavated soil conditions prevail.

8 Claims, 4 Drawing Sheets

IMPACT DRIVEN TREE TRANSPLANTING APPARATUS

FIELD OF INVENTION

The present invention relates generally to a tree transplanting apparatus, also known as a tree spade, and more particularly to an impact driven tree transplanting apparatus.

BACKGROUND OF THE INVENTION

For a wide variety of reasons, it is often necessary to transplant live trees. This is a delicate process requiring the tree to be excavated with the roots substantially intact and maintained in a large quantity or ball of earth so that the roots and associated dirt may be placed within a hole at another location. While such a process may be accomplished by hand when small trees are involved, transplanting larger trees requires specialized equipment.

Mechanized tree transplanting machines capable of excavating large trees and transporting the same to another location are known and commercially available. Typically, such devices include a plurality of blades that may be pushed into the ground around a tree by hydraulic cylinders. Once fully inserted into the ground, a lifting mechanism such as another hydraulic cylinder is employed to lift the tree, and any earth surrounding the roots, out of the ground. Such devices are ordinarily mounted on a trailer or other wheeled vehicle, allowing the tree to be easily transported to the new location where it is lowered into a hole that has been previously excavated to receive the tree.

While the use of such hydraulically powered tree spades has proven to be generally successful, in many instances, the hydraulic cylinders are unable to effectively force the excavation blades into the ground surrounding the tree. This is often due to an abundance of tough roots, rocks, or merely particularly hard soil. Attempting to force the excavation blades into the ground under such conditions may overload the hydraulic cylinders, hoses, pumps, and other components resulting in damage to the hydraulic system and usually in spilled hydraulic fluid. While it is possible to increase the capacity of the hydraulic cylinders used to force the excavation blades into the ground, these larger hydraulic cylinders are more expensive and may require other machine components to be correspondingly strengthened which increases the cost of the machine. Merely increasing the size of the hydraulic cylinders without changing the action or design of the overall machine may result in damage to the excavating blades and or related components. Because the constant pushing or pulling force of ordinary fluid cylinders is often not sufficient to force the excavation blades through roots, rocks, and other obstructions, when one or more of the excavating blades is blocked by such an obstruction, the reaction force of the hydraulic cylinder(s) against the obstruction often causes the tree spade to be suddenly lifted off the ground. This is a dangerous condition for the machine operator and can also result in damage to the tree spade or the tree being removed from the ground.

Another prior device is a small, lightweight, hand-operated device that utilizes a rapidly reciprocating hammer to individually force a plurality of blades into the ground surrounding a tree. Once the tree is completely encircled by these separate blades, the apparatus is moved out of position leaving the blades behind. The blades are tied together at the upper regions by spoke-like members so that a separate machine, such as a tractor, may be moved into position to lift the tree from the ground. The apparatus is sufficiently lightweight that it may be lifted into position by two workers. However, the extremely lightweight nature of the apparatus requires a worker to stand upon the machine and grasp the hammer apparatus to provide the weight necessary to force the blades into the ground. This results in a large amount of operator fatigue and necessarily limits the effectiveness of the apparatus when extremely thick roots or rocks are found around the base of a tree. Also, such a prior device does not include a source of power to drive the rapidly reciprocating hammer and therefore, an external source such as a portable air compressor must be provided nearby the apparatus to supply power to the hammer.

In light of the foregoing, there has been found a need to provide a tree transplanting apparatus capable of driving tree excavating blades into the ground around a tree even when extremely hard soil, roots, rocks, or other obstructions are found around the tree being transplanted. There has also been found a need to provide such an apparatus that does not require a large amount of exertion on the pan of the machine operator and that includes a source of power so that the apparatus need not be connected to an external source.

SUMMARY OF THE INVENTION

The present invention is therefore directed to an impact driven tree transplanting apparatus comprising a chassis, a blade assembly, including at least one excavation blade, connected to the chassis, at least one impact device for generating and/or transferring a series of successive blows to the excavation blades of the blade assembly, and a source of power for actuating the at least one impact device.

The present invention provides many advantages over known tree transplanting machines including the advantage of being able to cut through roots and break through or displace rocks and other obstructions without placing an undue amount of stress on other machine components. Also, the impact driven excavation blades of the present invention are less likely to cause the tree transplanting apparatus to be lifted upward upon hitting an obstruction as currently occurs with known machines utilizing only fluid cylinders to force the excavation blades into the ground. The apparatus includes a source of power to actuate the at least one impact device, thereby eliminating the need to provide an external source of power nearby the apparatus.

DETAILED DESCRIPTION OF THE PREFERRED EMBODIMENT

Figure 1:
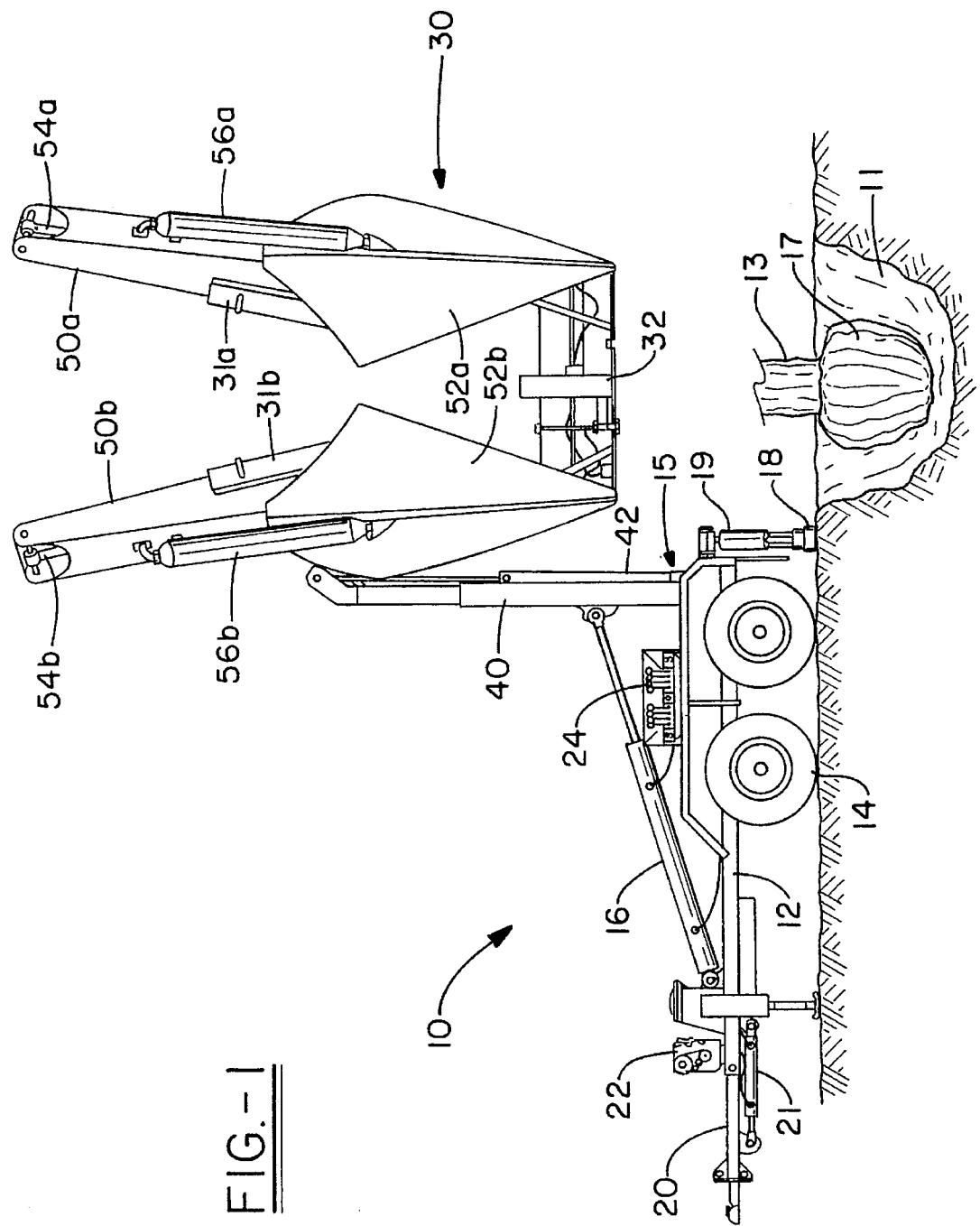
FIG. 1 is a side elevational view of the present invention.

Reference will now be made in detail to the present preferred embodiment of the invention, an example of which is illustrated in the accompanying drawings. Wherever possible, the same reference numbers will be used throughout the drawings to refer to the same or like parts.

The tree transplanting apparatus or tree spade of the present invention is shown generally at 10 in the figures and comprises an excavation blade assembly 30 mounted on a chassis 12. Chassis 12 is shown as a trailer although any suitable chassis such as a truck, tractor, or similar vehicle may be utilized. Chassis 12 preferably includes wheels 14 so that the tree spade 10 may be easily transported to various locations as desired. One or more stabilizers 18 are provided and may be raised and lowered as desired to stabilize tree spade 10 during machine operations as will be discussed in more detail below. Stabilizers 18 may be manually raised and lowered or may be connected to fluid cylinders 19 as shown such that they may be automatically raised and lowered. Chassis 12 may also be provided with a telescoping tongue 20 connected to adjustment means such as fluid cylinder 21 such that upon activation of cylinder 21, tongue 20 may be either lengthened or shortened relative to chassis 12 and act against a towing vehicle (not shown) to precisely position tree spade 10, and more particularly blade assembly 30, relative to a tree 13 being excavated from the ground 11 or relative to a hole in the ground that has been excavated to receive a tree being transplanted from another location as is discussed in greater detail below. Chassis 12 also includes a source of power mounted thereon. For example, a diesel or gasoline engine 22 may be utilized to generate electricity and/or to drive a pump/compressor that provides pressurized fluid to the various fluid cylinders and impact devices discussed herein. An operator's station 24 is also provided and includes a variety of machine controls such as electrical switches and pneumatic and/or hydraulic control valve assemblies allowing a machine operator to control all machine operations from operator's station 24.

Figure 3:
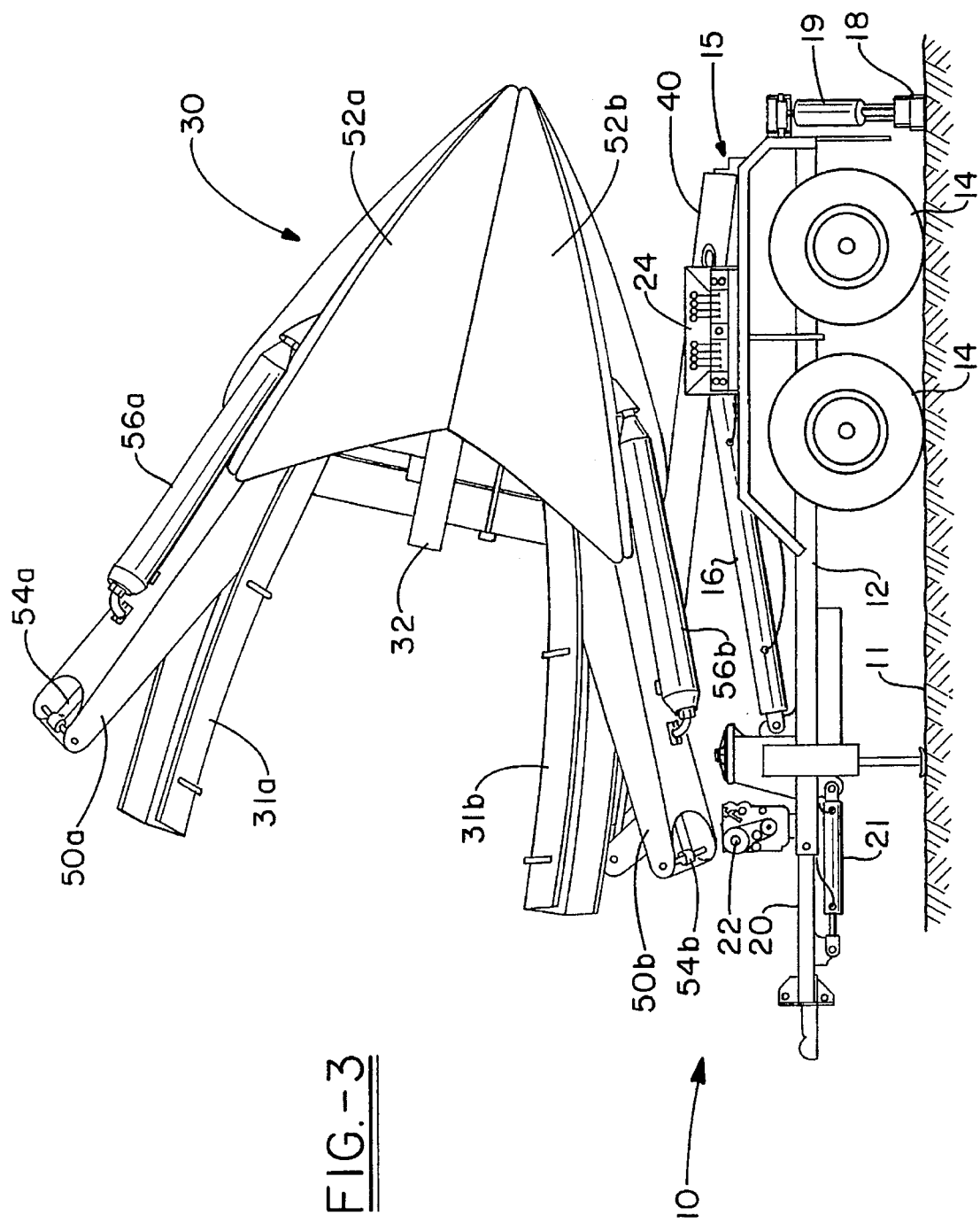
FIG. 3 is a side elevational view with the excavation blades in position for transport.
Figure 4:
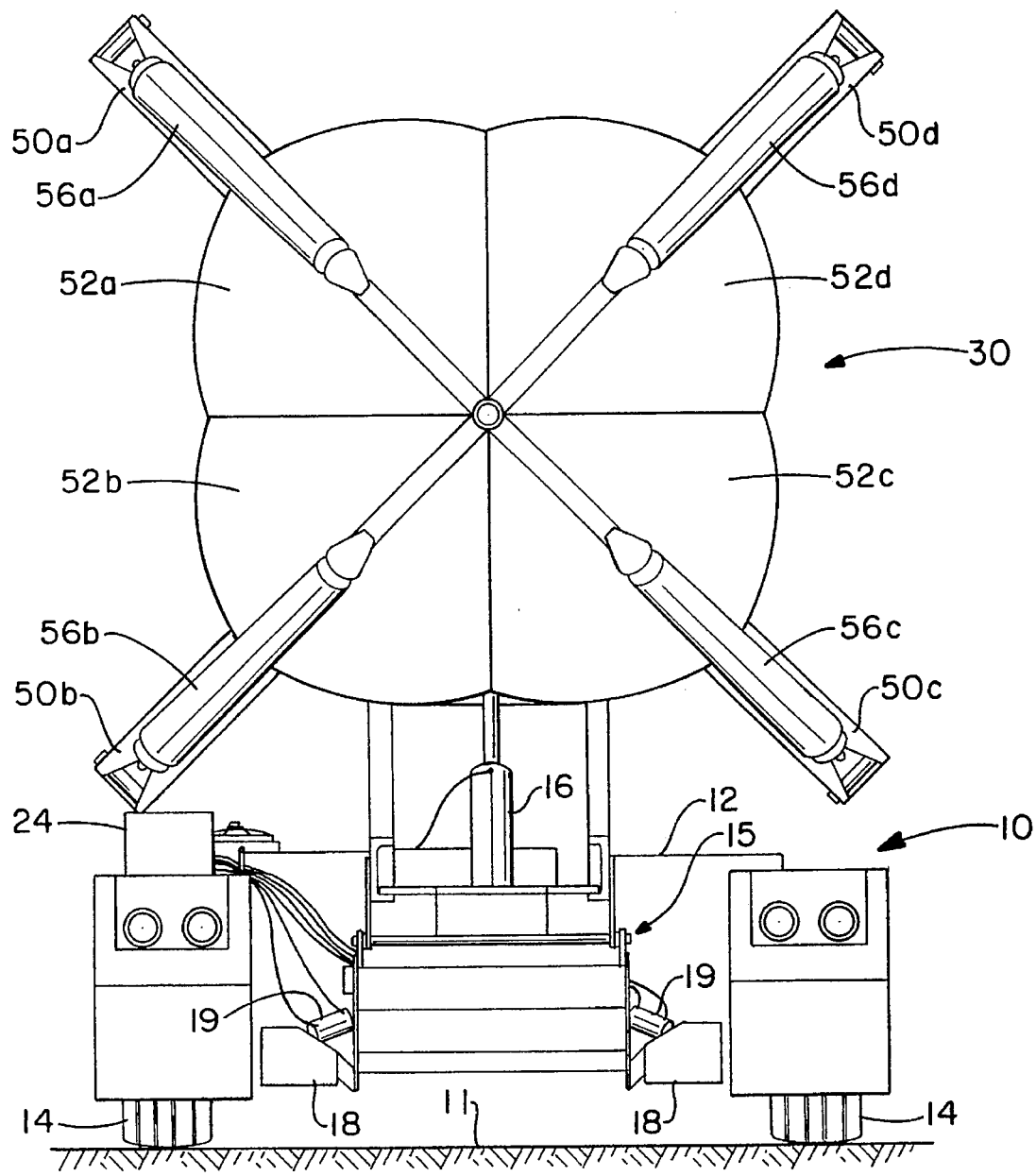
FIG. 4 is a rear elevational view with the excavation blades in position for transport.

Blade assembly 30 is preferably pivotally connected to chassis 12 by means of a hinge assembly 15 such that blade assembly 30 may be positioned for transport as is shown in FIGS. 3 and 4. A fluid cylinder such as hydraulic cylinder 16 is connected between chassis 12 and blade assembly 30 to pivot blade assembly about hinge 15. Blade assembly 30 is connected to chassis 12 by a boom 40. Means are provided for moving blade assembly 30 along boom 40 such that the height of blade assembly 30 relative to the ground 11 may be adjusted. For example, means for raising and lowering the blade assembly 30 on boom 40 may be provided by a hydraulic cylinder 42 or other fluid cylinder connected between chassis 12 and boom 40. As will be explained in further detail below, action of cylinder 42 allows blade assembly 30 to be properly positioned adjacent to the ground 11 surrounding a tree 13, provides a lifting force to extract a tree 13 from the ground 11, and allows a tree being transplanted to be properly lowered into a previously excavated hole.

Blade assembly 30 comprises a frame or base 32 designed to at least substantially encircle a tree 13 to be removed from the ground 11. Therefore, blade assembly base 32 is split, preferably at a rear portion, so that it may be opened, placed around a tree 13, and closed to at least substantially encircle the tree 13 being excavated. Base 32 is shown in the closed position in FIGS. 1, 3, and 4 and in the open position in FIG. 2. Means for opening and closing base 32 are provided such as fluid cylinders 34 (FIG. 2) that may be controlled from operator's station 24. Alternatively, base 32 may be manually opened and closed.

Figure 2:
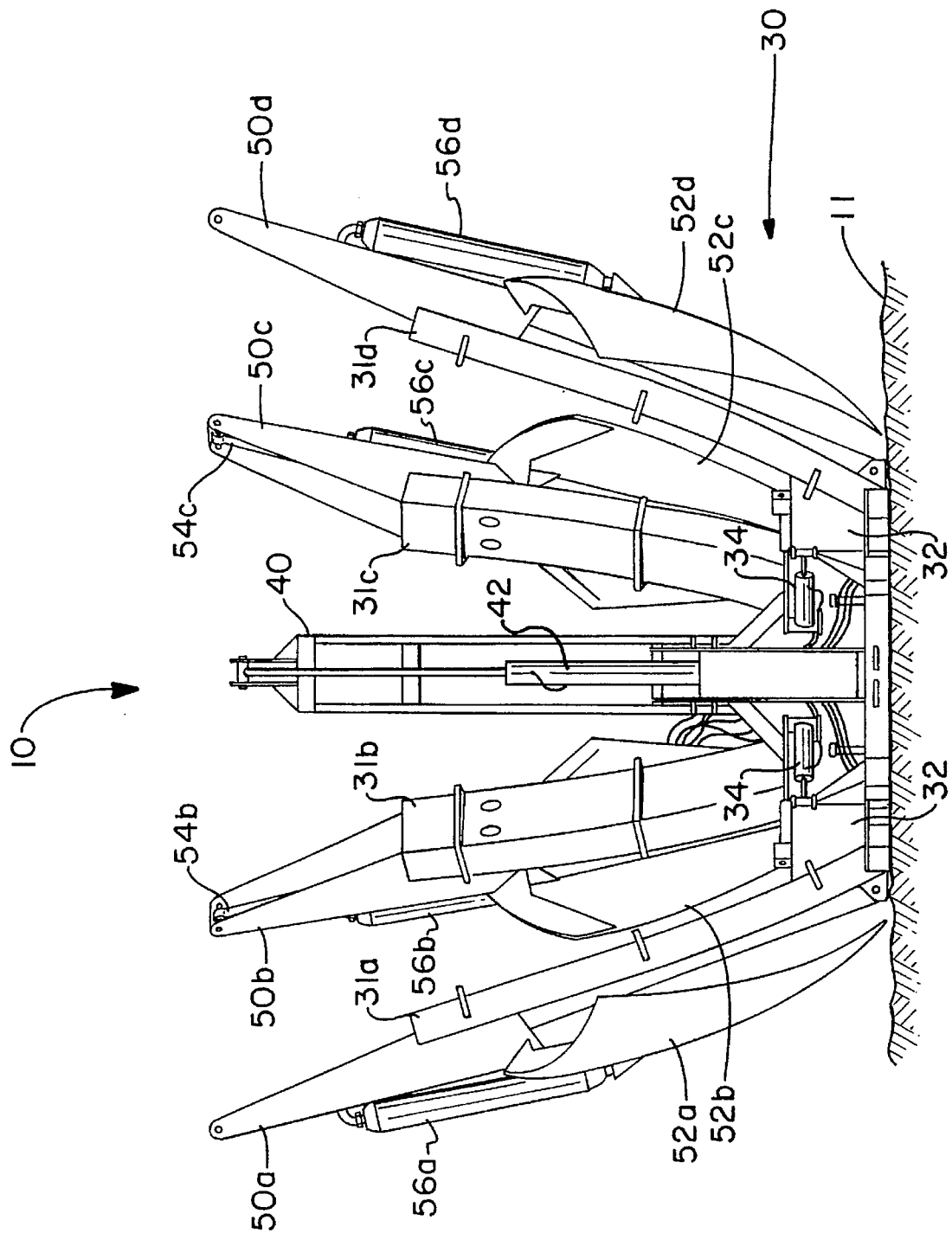
FIG. 2 is a rear elevational view of the present invention.

A plurality of blade guides 31a, 31b, 31c, 31d are connected to base 32 and extend upward therefrom such that each blade guide 31a–d slidably receives an extraction blade tower 50a, 50b, 50c, 50d. Each blade tower 50a–d correspondingly includes an extraction blade 52a, 52b, 52c, 52d connected thereto. Each blade tower 50a–d includes means for extending and retracting the tower 50a–d relative to blade guides 31a–d. Blade guides 31a–d are designed to facilitate the sliding movement of blades 52a–d and towers 50a–d relative to base 32. In the preferred embodiment, each blade tower 50a–d may be extended or retracted independently of the other towers 50a–d. For example, blade towers 50a–d each respectively house a fluid cylinder 54a, 54b, 54c, 54d such that upon pressurization of a cylinder 54a–d, the tower 50a–d housing cylinder 54a–d is extended upward within guide 31a–d causing blade 52a–d connected thereto to be correspondingly lifted into a retracted position as is shown in FIGS. 1 and 2. Depressurization or reverse pressurization of a cylinder 54a–d causes the tower 50a–d housing cylinder 54a–d to retract within its guide 31a–b thereby causing extraction blade 52a–d connected to tower 50a–d to be lowered so that it extends below blade assembly frame 32 as is shown in FIGS. 3 and 4. While the invention has been shown with four blade towers 50a–d and blades 52a–d, those skilled in the art will recognize that any suitable number may be utilized without departing from the scope of the present invention.

At least one impact device is provided as a part of blade assembly 30 to facilitate the insertion of excavation blades 52a–d into the ground surrounding a tree 13. In the preferred embodiment, each excavation blade 52a–d includes an impact device for generating and/or transferring or delivering a rapid succession of impacts or blows to the blades 52a–d. As shown, the impact device for each blade 52a–d is provided by a pressurized fluid impact device 56a, 56b, 56c, 56d respectively connected to each blade 52a–d and capable of generating and transferring a rapid succession of impacts or blows to blades 52a–d such that each blade is more easily driven into the ground 11 around tree 13 to encase a ball 17 of earth and roots at the base of tree 13. Impact devices 56a–d differ from ordinary pressurized fluid cylinders in that they contain a movable mass or similar means for generating and transferring a rapid succession of impact blows to the excavation blades 52a–d rather than generating a relatively constant pushing or pulling force as is exhibited by ordinary pressurized fluid cylinders. While an operator may attempt to control an ordinary fluid cylinder so that it reciprocates, the action is ineffective when compared to an impact device specifically designed to provide a rapid succession of blows. Pressurized fluid actuated impact devices 56a–d may be hydraulically actuated but are preferably pneumatically actuated and are supplied with pressurized fluid from an air compressor connected to and driven by engine 22. Other types of impact devices are contemplated for use in the present invention as impact means to drive blades 52a–d into the ground 11, and the present invention is not meant to be limited to the particular impact devices disclosed herein. Each impact device 56a–d is respectively connected between one of the blade towers 50a–d and its respective blade 52a–d such that upon activation of any one or more of impact devices 56a–d, corresponding blade 52a–d receives a rapid succession of impacts from impact device 56a–d. While action of an impact device 56a–d alone may be sufficient to cause a blade 52a–d to travel into the ground 11, it is thought preferable to use impact devices 56a–d in conjunction with the force of the fluid cylinders 54a–d to respectively force the excavation blades 52a–d into the ground 11. Downward force provided by cylinders 54a–d acts to constantly urge blades 52a–d further into the ground 11 while the impact devices 56a–d connected to each blade 52a–d facilitate the movement of the blade 52a–d into the ground 11 by cutting roots and breaking and/or displacing rocks. The rapidly repetitive blows produced by impact devices 56a–d provide a force that is much more effective in driving blades 52a–d into ground 11 relative to the use of ordinary fluid cylinders alone, especially in situations where numerous large roots and/or rocks are present in the ground 11 around the base of tree 13. The successive blows produced by the impact devices 56a–d are not harmful to the machine components as the use of fluid cylinders alone may be, and therefore use of impact devices 56a–d is thought to provide a tree transplanting apparatus 10 that is longer lasting and requires less maintenance relative to a tree transplanting apparatus utilizing ordinary pressurized fluid cylinders only to force blades 52a–d into the ground 11.

In operation therefore, once the tree spade 10 is on location, blade assembly 30 is pivoted into the operating position (shown in FIGS. 1 and 2) from the transport position (shown in FIGS. 3 and 4) by pressurizing cylinder 16 such that boom 40 pivots to a vertical position around hinge assembly 15. The vertical height of blade assembly 30 on boom 40 may be adjusted as desired utilizing cylinder 42 as is described above. The blades 52a–d are then retracted as is shown in FIGS. 1 and 2 by extending towers 50a–d upward from guides 31a–d using cylinders 54 housed in towers 50a–d. The base 32 of blade assembly 30 is then opened using cylinders 34 as is shown in FIG. 2 so that the blade assembly may be positioned around a tree 13 and the frame 32 closed so that blades 52a–d encircle the tree. Telescoping tongue 20 may be utilized to more precisely position the blade assembly 30 around a tree 13 so that the tree is excavated with a uniform ball 17 of roots and earth. Once the apparatus 10 is properly positioned, stabilizers 18 may be lowered to stabilize the chassis 12. The blade assembly 30 is then lowered to ground level or any other level as is required using cylinder 42 as is also shown in FIG. 2. One or more of the cylinders 54a–d is activated to force its respective tower 50a–d downward such that the excavation blades 52a–d are respectively forced into the ground 11 around a tree 13. If no large roots, rocks or other obstructions are encountered, impact devices 56a–d may not need to be activated. However, if required, impact devices 56a–d may be simultaneously or individually activated to respectively generate and transfer a rapid succession of impact forces or blows to blades 52a–d to operate in conjunction with the force of the cylinders 54 to force the blades 52a–d into the ground 11 to encase a ball 17 of earth and roots below tree 13. When all blades 52a–d have been substantially fully inserted into the ground 11 around the base of tree 13, cylinder 42 is once again activated to lift the blade assembly 30, including the tree 13 and associated ball 17 of earth and roots, upward from the ground 11.

To replant the tree 13 in another hole that has been previously excavated to receive the tree 13, the apparatus 10 is relocated such that the blade assembly 30, including the tree 13 held therein, is properly positioned above the hole. The stabilizers 18 may be lowered to stabilize the chassis 12 during all operations as desired. Cylinder 42 is depressurized or reverse pressurized so that blade assembly 30 is lowered toward the hole formed in the ground until blades 52a–d extend as fully into the hole as possible. Cylinders 54a–d may then be pressurized to respectively cause blade towers 50a–d to extend upward from their guides 31a–d. Each blade 52a–d is correspondingly lifted out of the hole with its tower 50a–d so that blades 52a–d retract relative to base 32. Cylinder 42 is then pressurized to lift blade assembly 30, and/or cylinders 34 are pressurized to open base 32 so that the apparatus 10 may be moved away from the newly transplanted tree 13.

From the foregoing, those skilled in the art will recognize that the tree transplanting apparatus 10 of the present invention has superior strength and durability relative to prior tree transplanting machines. The impact driven excavation blades 52a–d are able to cut through large roots, and break through and/or displace rocks that would present difficulties to non-impact driven tree spades. Also, the present invention 10 provides the ability to lift a tree 13 and its associated roots and dirt from the ground 11 and transport the same to another location for replanting. Those skilled in the art will recognize that the numerous fluid cylinders of the present invention may be hydraulic, pneumatic, or may be replaced by numerous equivalent devices such as gears, chains, cables, pulleys and the like. Also, while the foregoing description has set forth the preferred embodiment of the invention in particular detail, it must be understood that numerous modifications, substitutions, and changes may be undertaken without departing from the true spirit and scope of the present invention as defined by the ensuing claims.

What is claimed is:

1. An impact driven tree transplanting apparatus comprising:

a chassis;

a blade assembly including a base connected to said chassis, said blade assembly including a plurality of excavation blades slidably engaged with said base;

a plurality of pressurized fluid actuated cylinders, wherein each of said plurality of excavation blades of said blade assembly is connected to at least one of said pressurized fluid actuated cylinders such that each of said plurality of excavation blades is independently extendable and retractable relative to said base of said blade assembly with a relatively constant force in response to actuation of the pressurized fluid actuated cylinder to which it is respectively connected;

plurality of pressurized fluid actuated impact devices, wherein each of said plurality of excavation blades is connected to at least one of said impact devices to selectively receive a series of successive impact blows therefrom, wherein each of said plurality of pressurized fluid actuated impact devices is operable independently of each of said plurality of pressurized fluid cylinders; and, an internal combustion engine providing a source of power for actuating said pressurized fluid cylinders and said pressurized fluid impact devices, whereby said plurality of pressurized fluid actuated cylinders and said plurality of pressurized fluid actuated impact devices are operable separately and are operable in combination to urge said plurality of excavation blades into the earth.

2. An apparatus as recited in claim 1, wherein said base further comprises a plurality of blade guides connected thereto such that each of said excavation blades is slidably engaged with a blade guide to facilitate the sliding movement of each of said excavation blades relative to said base.

3. An apparatus as recited in claim 2, further comprising a plurality of blade towers, wherein each blade tower is slidably engaged with one of said blade guides, and wherein each of said excavation blades is connected to one of said blade towers.

4. An apparatus as recited in claim 3, further comprising means for raising and lowering said blade assembly relative to said chassis.

5. An apparatus as recited in claim 4, wherein said means for raising and lowering said blade assembly relative to said chassis is a fluid cylinder connected between said blade assembly and said chassis.

6. An apparatus as recited in claim 1, further comprising means for raising and lowering said blade assembly relative to said chassis.

7. An apparatus as recited in claim 6, wherein said means for raising and lowering said blade assembly is a fluid cylinder connected between said blade assembly and said chassis.

8. An apparatus as recited in claim 1, wherein said blade assembly is slidably connected to a boom extending from said chassis, and wherein said apparatus further comprises means for raising and lowering said blade assembly on said boom, relative to said chassis.

* * * * *